United States Patent [19]

Hunter

[11] Patent Number: 5,363,563
[45] Date of Patent: Nov. 15, 1994

[54] PALLET/SINE PLATE CONNECTOR

[75] Inventor: Jerry J. Hunter, Madison, Ind.

[73] Assignee: Doe Run Tooling, Madison, Ind.

[21] Appl. No.: 922,680

[22] Filed: Jul. 30, 1992

[51] Int. Cl.⁵ .............................................. B23Q 1/06
[52] U.S. Cl. ....................................... 33/568; 33/613; 269/74
[58] Field of Search .................. 33/568, 569, 570, 573, 33/537, 613, 645; 269/74, 70, 71, 101, 900; 409/224, 903; 403/161, 162, 163; 192/56 C

[56] References Cited

U.S. PATENT DOCUMENTS

| | | |
|---|---|---|
| 2,351,773 | 6/1941 | Lovenston . |
| 2,365,436 | 2/1942 | Saucier . |
| 2,369,148 | 8/1943 | Langhorst . |
| 2,449,459 | 9/1948 | Eckert . |
| 2,778,053 | 1/1957 | Hess et al. . |
| 2,889,757 | 6/1959 | Cole . |
| 3,075,291 | 1/1963 | Robertson et al. . |
| 3,094,821 | 6/1963 | Eckert . |
| 3,432,934 | 3/1969 | Schmidt . |
| 3,788,633 | 1/1974 | Cho . |
| 3,862,498 | 1/1975 | Klucznik . |
| 4,527,683 | 7/1985 | Mathews ........................... 192/56 C |
| 4,635,887 | 1/1987 | Hall et al. ............................. 33/568 |
| 4,726,576 | 2/1988 | Siniko . |
| 4,927,125 | 5/1990 | Hunter . |

FOREIGN PATENT DOCUMENTS 2048398 12/1980 United Kingdom ............. 192/56 C

OTHER PUBLICATIONS

Workholding System for Multiple Operations on Multiple Machine Tools. by James A. Masar, Apr. 1989.

Primary Examiner—William A. Cuchlinski, Jr.
Assistant Examiner—Alvin Wirthlin
Attorney, Agent, or Firm—Wood, Herron & Evans

[57] ABSTRACT

A workpiece holding system includes a connector for mounting a workpiece-holding pallet or upper plate to a workstation with the high degree of accuracy that is necessary for workpiece machining operations. The upper plate connects to the workstation via a pair oppositely directed, extendable/retractable connectors aligned along an axis of connection, with a total of four connectors and two spaced axes of connection. Each connector includes a pin, an actuating knob and a wrap spring. For each connector, extension and retraction along the respective axis occurs by rotation of the actuating knob. The wrap spring interconnects the actuating knob to the pin in a slippable manner. The wrap spring acts as a torque limiting device during rotation of the knob to extend the pin into engagement with the upper plate, and it acts as a clutch during rotation of the knob to retract the pin from engagement with the pallet.

19 Claims, 4 Drawing Sheets

PALLET/SINE PLATE CONNECTOR

FIELD OF THE INVENTION

This invention relates to a connector for mounting a workpiece-holding pallet, a sine plate or a workpiece to a workstation.

BACKGROUND OF THE INVENTION

Applicant's co-owned U.S. Pat. No. 4,927,125 discloses a set-up assembly with upper and lower plates hingedly connectable and disconnectable along two spaced parallel axes. Applicant expressly incorporates U.S. Pat. No. 4,927,125 by reference herein, in its entirety. Aligned with each axis, the set-up assembly includes a pair of axially extendable and retractable center pins mounted on one of the plates which may be quickly and easily moved along the axis into and out of engagement with the other plate. The use of extendable and retractable center pins to accurately hold the upper plate to the lower plate simplifies set up operations and reduces the operator's set-up time for those machining operations which require hinged raising of either end of the upper plate.

The extendable and retractable center pins also facilitate machining operations which require simple, fast and effective holding of a pallet to a support plate. With a plurality of pallets, a workpiece mounted to each pallet, and a machining device located adjacent a lower plate in an operating position, the workpiece-holding pallets can be connected and disconnected to the lower plate in assembly line fashion to reduce machining time and expense.

With this set up assembly, the center pins are spring-biased inwardly toward the pallet. To retract the pins, the pins are pulled outwardly against the spring force and then rotated perpendicularly into a latched position. For larger size plates, i.e., ten inches by twelve inches, the spring force is generally much higher, so that the upper plate can be held securely in position for machining operations. Unfortunately, for upper plates of this size, the high spring force makes it difficult to manually retract the pins outwardly from engagement.

Moreover, because of the structural relationship of the pin, the spring and the lower plate, this structure does not lend itself particularly well to automated placement, securement and removal of the upper plate to a workstation. This is due primarily to the susceptibility of pin or pin component breakage if the pin is retracted too far or rotated at the wrong time.

SUMMARY OF THE INVENTION

It is an objective of this invention to facilitate the automating of set up operations for accurately and repeatably mounting a workpiece-holding pallet to a support plate for the performance of a machining operation on the workpiece.

It is another objective of the invention to facilitate the retraction of center pins from engagement with a relatively large size workpiece-holding pallet.

This invention meets the above-stated objectives by utilizing an extendable and retractable connector which rotates into and out of engagement with a workpiece holding pallet. More particularly, the connector includes a pin, an actuating knob or handle for rotating the pin and a wrap spring which interconnects the pin and the knob in a slippable manner. The wrap spring acts as a torque limiting device to control the pressure in one direction, and the wrap spring acts as a clutch in the opposite direction.

The pin mounts within a bore machined in a lower plate at a workstation. An external surface of the pin which is located within the bore includes a spiral cam which coacts with a radially inwardly directed cam follower that is rigidly connected to the lower plate. The cam follower resides within and traverses the cam so that the pin will extend or retract upon rotation of the actuating knob. During rotation of the knob to extend the pin, the wrap spring will slip if the knob is rotated too far. Thus, the connector acts as a torque limiting device to limit the rotational force applied to the pin once the pin is fully extended. This construction assures that an automatic rotating mechanism such as a stepping motor will not inadvertently break the pin during extension by accidentally rotating too far. Moreover, this construction assures that, during tightening, a predetermined bending moment will be applied to the outer support rails of the lower plate.

During rotation to retract the pin, the wrap spring acts as a clutch by magnifying the rotational force applied to the pin. Because of the spring connection between the pin and the actuating knob, along with the slope of the spiral cam, only minimal rotational force is required to rotatably retract the pin.

Preferably, four of these pins are extended into engagement with the pallet to securely hold it in place at the workstation, with the four pins directed inwardly along a pair of spaced, parallel axes. At each point of engagement, an inwardly directed end of the pin and an engaged surface of the pallet are complementarily angled to provide precise and repeatable positioning of the pallet for machining operations.

According to one aspect of the invention, the pallets may be machined from a relatively light weight aluminum and may be connected and disconnected in assembly line fashion at the workstation, with each of the pallets holding a workpiece. Because of the spiral cam and the slippable connection between the pins and their respective actuating knobs, this invention facilitates the automatic placement, connection and disconnection of the pallets at a workstation with a degree of precision within a ten thousandth of an inch, thereby facilitating accurate assembly line machining of multiple workpieces mounted on multiple pallets. The aluminum pallets may be automatically placed on the workstation, slid laterally into position by a robot and then accurately secured to the workstation automatically by using stepping motors to rotate the four pins into engagement with the pallet. If desired, the sequence of operation of the robot and the stepping motion may be controlled by a programmable computer.

Depending upon the shape and the configuration of the pallets, this invention also provides versatility in use. The bottom of the pallet may include a pair of spaced rolls, or rounded support members, for coacting with the pins so that the pallet may be used as a sine plate and hingedly raised at either end, as depicted and described in U.S. Pat. No. 4,927,125. Additionally, if the spaced mounting members are squared off on their bottoms and outer side surfaces, the pallet may actually be mounted vertically on either of its ends, perpendicular to the lower plate. In this position, a workpiece mounted to the pallet can be supported in a desired vertical plane.

According to one preferred embodiment of the invention, four pallet connecting mechanisms are mounted to a lower plate which defines a workstation. The connectors are arranged so as to engage the pallet on two sides, along two spaced parallel axes. For each connector, the lower plate includes a mounting bore sized to receive a pin. The outer surface of the pin has a recessed spiral cam which cooperates with a radially directed cam follower rigidly connected to the lower plate and extending into the mounting bore. Upon rotation of the pin, the cam follower traverses the spiral cam and causes the pin to move axially with respect to the lower plate and to extend into or retract from engagement with the pallet.

This spiral cam extends once around the pin and includes an initial steeply inclined portion and a gradually inclined portion. Initially, rotation of the pin causes substantial axial movement while the cam follower traverses the steeply inclined portion of the spiral. However, after the pin has been rotated about 90°, the cam follower traverses the gradually inclined portion of the spiral, and the pin moves only slightly. When retracting the pin, the opposite occurs. The pin initially retracts slowly and then, in the last 90°, retracts substantially.

The forward or inner end of each pin has an angled surface which is machined to an angle which is complementary with an angled surface of an outer edge of a bore machined in the pallet. To connect the pallet, the pallet bores are aligned with the bores in the lower plate along the spaced axes, and the pins are extended inwardly into engagement with the pallet. The complementarily angled surfaces coact to assure that the pallet will be securely held in a precise position, within a minimal tolerance.

Each of the pins has a rearward, or outer end, which connects to an enlarged-diameter actuating knob. The knob facilitates rotation of the pin. More specifically, a wrap spring interconnects the pin and the actuating knob. The wrap spring has a radially extending tang which is held by the actuating knob and a plurality of coils which wrap around the outer surface of the pin. Depending upon which way it is desired to rotate the knob to affect extension of the respective pin, and whether or not the spring is wound with a left or right hand wrap, the tang may be either at the forward or the rearward end of the connector. The wrap spring has an inner diameter which is slightly less than the outer diameter of the pin, with the relative diameters depending upon the amount of torque wanted. Preferably, the inner surface of the wrap spring is flat to more securely engage the outer surface of the pin.

The wrap spring connects the actuating knob to the pin in a slippable manner. Because of the slippable interconnection between the actuating knob and the pin, the wrap spring acts as a torque limiting device when extending the pin. Thus, this invention eliminates the susceptibility of the pin to breakage when the pin is automatically rotated to extend and retract the pin into and out of engagement with the pallet. It also controls, to a preset amount, the force applied to the lower plate during extension which may cause rail deflection. The actuating knob may have an outer surface which is configured to facilitate manual grasping and turning to rotate the pin. The actuating knob may also include radially oriented holes sized to receive a radially inserted tommy bar to facilitate rotation of the pin about the axis when used manually. In an automated embodiment of the invention the actuating knob may be a toothed or beveled gear which can be easily connected to and automatically driven by a stepping motor.

One primary advantage of this invention relates to the use of a gear and a stepping motor to rotate the pin about 360° to provide automatic, positive and precise engagement of the pin with the pallet. With four such pins engaging the pallet on opposite sides along a pair of spaced, parallel axes, as described above, extension and retraction of the pins may be fully automated with four stepping motors and a controller.

In addition to automating the extension and retraction of the connectors, the invention contemplates the automatic placement, positioning and then removal of a pallet from a workstation using four connectors. According to this embodiment, each of a first pair of spaced connectors on a first side of the workstation has a forward portion and a rearward portion, and the two portions are interconnected by an internal compression spring aligned along the engagement axis. For each of the first connectors, a tap screw extends internally along the outer portion, through the internal compression spring and is threaded into the forward portion.

The spring force causes the forward portion of the pin to extend forwardly along the axis away from the rearward portion. The actuating knob connects to the rearward portion, and the forward portion includes the angled surface adapted to engage the side of the pallet.

With all of the connectors retracted within their respective bores, a computer controlled robot arm places the pallet at the workstation at a position relatively close to a predetermined machining position. The actuating knobs of the connectors on the first side, i.e. the spring loaded side, are then rotated in the direction which would normally extend the pins. However, because the pallet blocks extension of these pins, the internal springs compress axially as the forward portions of the pins bear against the side of the pallet. Thus, this rotation "loads" the internal springs.

The pallet is then moved slightly laterally to align the tapered engagement surfaces of the pallet with the four connectors. This lateral movement allows the forward portions of the first pair of connectors to extend by spring force toward the pallet along the spaced axes and into engagement with the pallet on the first side.

Subsequently, the actuating knobs connected to a second pair of spaced connectors on a second, opposite side of the workstation are automatically rotated by stepping motors to extend the second pair of connectors into secure engagement with the opposite side of the pallet. The force applied by the connectors on the second side also holds the pallet against the rail or shoulder at the first side of the work station, with the same force applied each time because the force is controlled by the wrap springs. This method and structure connects the workpiece holding pallet securely to the workstation in a precise and repeatable position.

After a machining operation has been performed on the workpiece, the actuating knobs are again rotated 360° to retract all four connectors from engagement with the sides of the pallet. The robot arm then picks up and removes the pallet, and another pallet is positioned at the workstation according to the same sequence of steps. By operatively connecting the robot arm and the stepping motors to a programmable controller, this entire sequence may be automated. If desired, the workstation may include an electronic eye, or other type of position detector to verify that the pallet is centered at the predetermined position prior to rotation of the actuating knobs to extend the connectors into engagement with the pallet.

According to another variation of the invention, the connectors engage the workpiece itself, rather than a pallet. To accomplish this manner of supporting a workpiece, a base plate would be constructed with appropriately positioned holes that would accept vertically oriented members for horizontally supporting both spring loaded and high pressure spiral connectors. The members would be used as pairs in various heights and sizes to suspend a workpiece of any size or shape. Two pairs or more could be used if necessary, as long as their bores are aligned. By extending the connectors mounted in these aligned bores into secure engagement with the workpiece, the workpiece can be held in a precise position for the performance of a machining operation.

These and other features of the invention will be more readily understood in view of the following detailed description and the drawings.

DETAILED DESCRIPTION OF THE DRAWINGS

Figure 1:
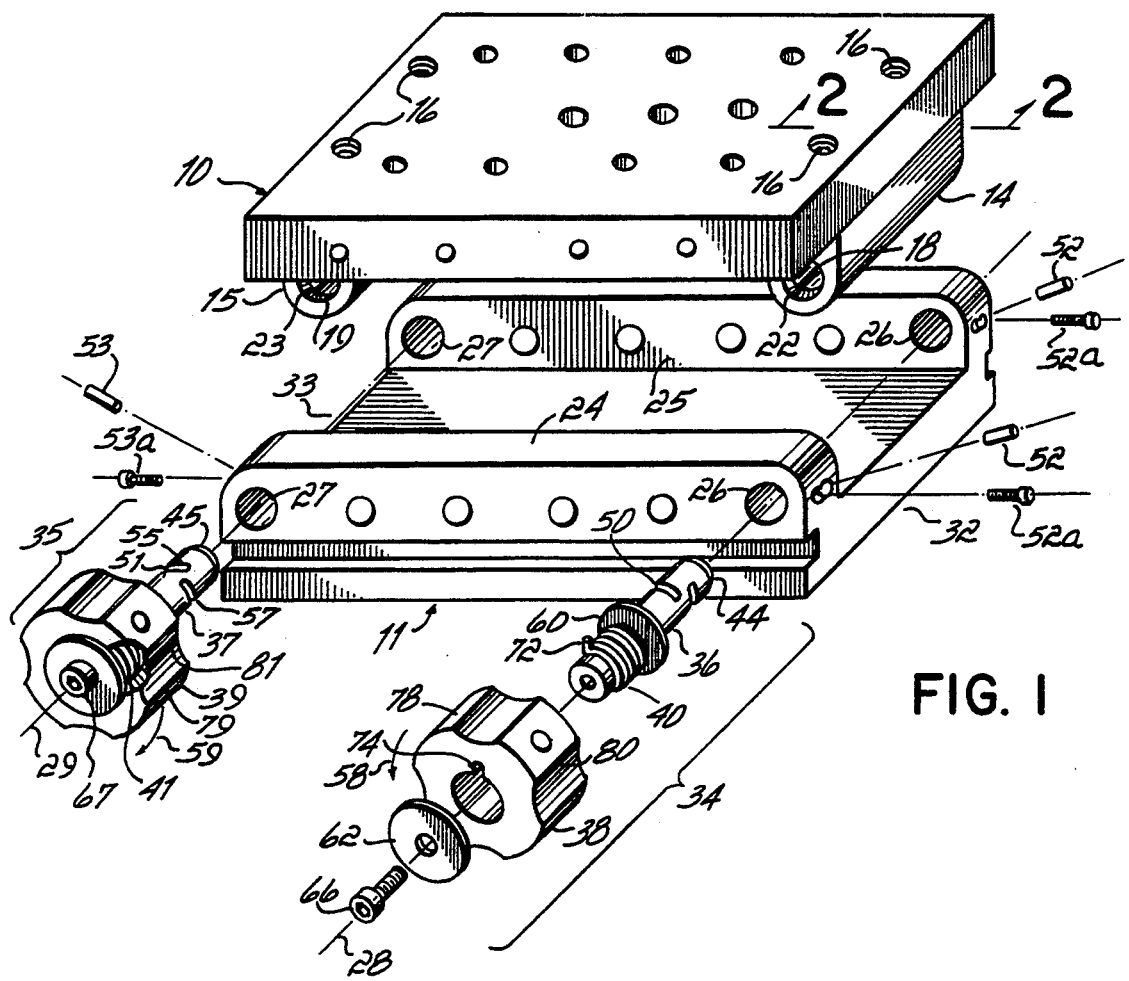
FIG. 1 illustrates, in a partial disassembled perspective, a pallet which is connectable to a lower plate in accordance with a preferred embodiment of the invention.

FIG. 1 shows a pallet or upper plate 10 which is used to hold a workpiece (not shown) during a machining operation, such as grinding or milling, etc. The pallet 10 may be formed of hard metal, aluminum or soft steel. The pallet 10 is located above a lower plate, or mounting member 11 which defines a workstation for performing an operation on a workpiece (not shown) held by the pallet 10. The bottom of the pallet 10 includes a pair of spaced, parallel mounting supports 14 and 15. These mounting supports 14 and 15 may be integrally formed with a pallet 10, or they may be removably connected thereto by screws 16 and dowel pins 17, as shown in FIGS. 2 and 3.

Figure 2:
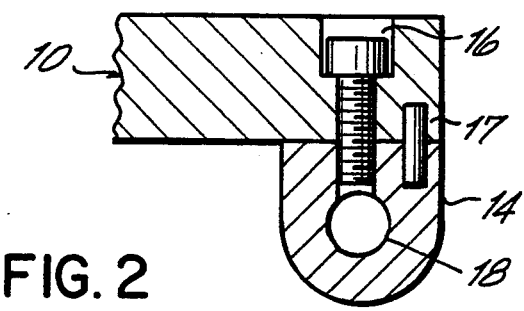
FIG. 2 is a cross-sectional view taken along lines 2—2 of FIG. 1 which depicts a pallet constructed in accordance with a first embodiment of the invention.
Figure 3:
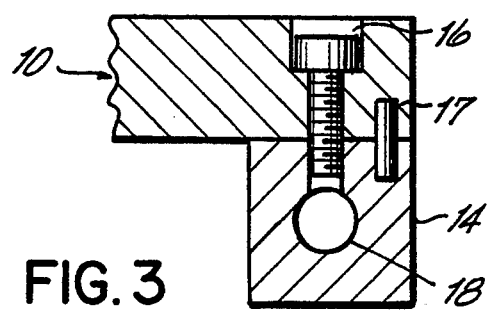
FIG. 3 is a partial view, similar to FIG. 2, of a pallet constructed in accordance with a second embodiment of the invention.

As shown in FIG. 2, the mounting supports 14 and 15 may be round with a specific radius if the pallet 10 is to be used as a sine plate. For work operations which do not require the sine plate function, the mounting supports 14 and 15 may be flat on the bottom and the outer sides, as shown in FIG. 3. This enables the pallet 10 to be connected to the workplate 11 in either horizontal or vertical orientation, if desired.

The mounting supports 14 and 15 have bores 18 and 19, respectively, machined therethrough. The outer ends of the bores 18 and 19 are tapered to define outwardly directed, angled surfaces. Bore 18 includes a pair of spaced, outwardly directed, angled surfaces 22, and bore 19 includes a pair of spaced, outwardly directed, angled surfaces 23.

The lower plate 11 includes a pair of spaced shoulders 24 and 25 oriented perpendicular to the supports 14 and 15. The shoulders 24 and 25 support the pallet 10 outboard of the mounting supports 14 and 15 on opposite sides of the workstation. Each of shoulders 24 and 25 has a pair of spaced bores, 26 and 27, respectively, machined therethrough. At both ends of the lower plate 11, the bores 26 and 27 are in alignment with the pallet bores 18 and 19, respectively, along a pair of spaced axes of engagement. More specifically, the bores 26 are aligned along an axis 28 of engagement at a first end 32 of the lower plate 11. Similarly, bores 27 are aligned along an axis 29 of engagement at a second end 33 of the lower plate 11.

Four pin assemblies, or connectors reside within the four bores 26 and 27 of the lower plate 11. More specifically, two pin assemblies 34 are located within the two spaced bores 26 in plate 11, aligned along axis 28 and directed inwardly toward each other. Similarly, two pin assemblies 35 are located within the two spaced bores 27, aligned along axis 29 and directed inwardly toward each other. (See FIGS. 1, 2 & 6A)

At each end 32 or 33 of the lower plate 11, the connectors 34 or 35, respectively, are mirror images of each other with respect to a mid-plane parallel with shoulders 24 and 25. On each side of the lower plate 11, the connectors 34 and 35 are mirror images of each other with respect to a mid-plane transverse to shoulders 24 and 25.

Each pin assembly 34 or 35 includes a pin, an actuating knob or handle, and a wrap spring interconnecting the pin and the actuating knob in a slippable manner. At first end 32, each pin assembly 34 includes a pin 36, an actuating knob 38 and a wrap spring 40. Similarly, at second end 33, each pin assembly 35 includes a pin 37, an actuating knob 39 and a wrap spring 41. Each pin 36 or 37 has a preferable length of about 2.568", an outer diameter of about 0.500" at its forward or inner end and an outer diameter of about 0.565" at its outer or rearward end.

Applicant has used wrap springs 40 and 41 made of round, spring steel wire having a diameter of about 0,148". The wrap springs 40 and 41 were made from a coil with about 4⅛ or more turns, the coil having an initial outer diameter of about 0.843" and an initial inner diameter of about 0.547". The inner diameter and outer diameter of the coil were then ground to dimensions of 0.552" and 0.824", respectively. This produced wrap springs 40 and 41 with a flat inside surface, thereby increasing the clutching or grabbing power. With these dimensions, when the connector 34 or 35 is rotatably extended into engagement with the pallet 10, the wrap spring 40 or 41 should slip upon application of 30 inch pounds of torque about the axis 28 or 29, respectively.

For optimum results, it is believed that the wrap springs 40 and 41 should be made from a wire which is rectangular in cross section. This rectangular shape would minimize any adverse affects on the spring characteristics caused by grinding the inner and outer diameters after heat treatment.

Figure 4:
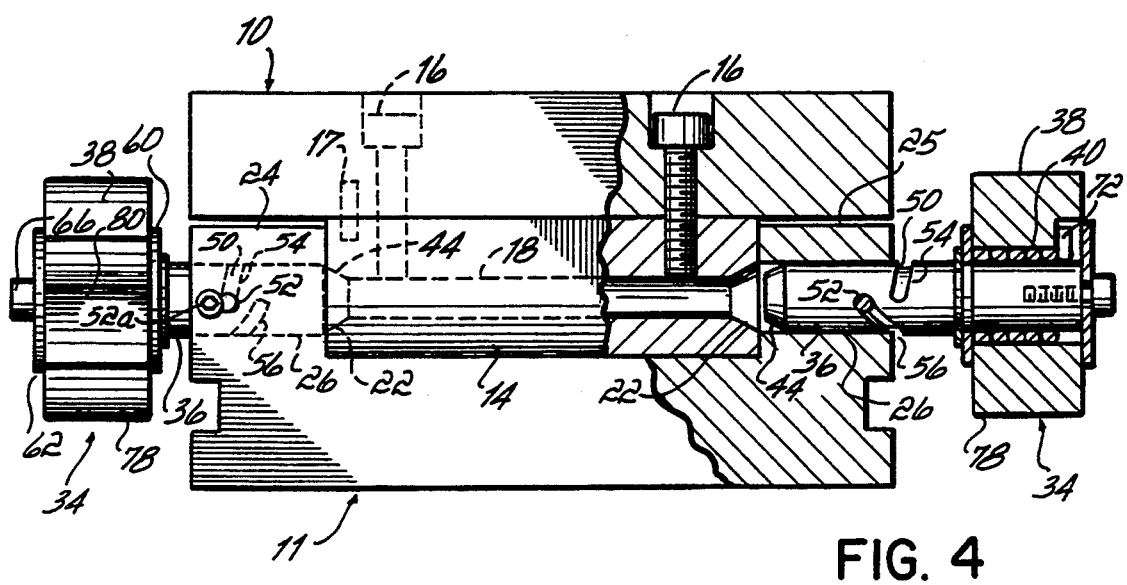
FIG. 4 is a partial cross-sectional view which illustrates a pallet aligned with a lower plate along an axis of engagement and partially connected to the lower plate via two connectors constructed according to a first preferred embodiment of the invention.

Each pin 36 or 37 includes an angled or tapered surface 44 or 45, respectively, at its forward or inner end which engages the pallet 10. Preferably, these surfaces 44 and 45 are tapered at an angle of about 7°30', around the entire circumference of the respective pin 36 or 37. The surfaces 44 and 45 engage the complementarily angled surfaces 22 and 23, respectively, at the outer ends of the bores 18 and 19. The complementary angles coact to hold the pallet 10 in a precise and repeatable position at the workstation, as shown in FIG. 4.

Each pin 36 or 37 has a spiral cam 50 or 51, respectively, formed in its outer surface. FIG. 4 shows two cams 50 in the outer surfaces of two spaced pins 36. The cams 50 coact with cam followers 52 which are connected to the lower plate 11 and which extend radially into the bores 26. Preferably, the cam followers 52 are hardened and ground 0.1875" pins. The cam followers 52 slide into the outer side of the lower plate 11 at first end 32 and extend radially into the bores 26. The cam followers 52 are retained with a small amount of clearance with a small button head Allen screw threaded into lower plate 11 at first end 32. The head of screw 52A holds in place the radial outer end of the cam follower 52. Preferably, each cam follower 52 is internally threaded at its outer end so that it can be removed. During rotation of the pins 36 to extend and retract the connectors 34 into and out of engagement with the pallet 10, the cam followers 52 traverse the cams 50. Similarly, at the second end 33, the two pins 37 include cams 51 which coact with cam followers 53, and cam followers 53 are held in place by screws 53B.

Preferably, each cam 50 or 51 extends about 360° around the respective pin 36 or 37, and includes a steeply inclined portion 54 or 55 and a gradually inclined portion 56 or 57 (FIG. 1). The gradually inclined portion 56 or 57 extends about 270° around the respective pin 36 or 37. The steeply inclined portion 54 or 55 extends about 90° around the respective pin 36 or 37. The cams 50 or 51 are located about midway between the forward and rearward ends of the respective pins 36 or 37.

For each connector 34 or 35, rotating inwardly about the respective axis 28 or 29 ("inward" rotation is shown by directional arrows 58 and 59 in FIG. 1) extends the respective pin 36 or 37 toward the pallet 10. During initial rotation, and for about 90° of rotation, the cam followers 52 or 53 traverse the steeply inclined portions of the respective cams 50 or 51, thereby substantially extending the respective pins 36 or 37. During rotation through the steep portions, each of the pins 36 or 37 of the connectors 34 or 35 extends toward the pallet 10 along the respective axis 28 or 29 a distance of about 0.125". During rotation through the gradually inclined portion 56 or 57, each pin 36 or 37 extends about another 0.027", thus, the total horizontal travel of each pin 36 or 37 is about 0.152".

These dimensions may vary due to heat treatment. Moreover, if the connectors on one side have greater holding force then the connectors on the opposite side, as was described in the previously identified patent and later in this detailed description, the horizontal travel will cease after the pin 36 or 37 has contacted the member 14 or 15 and pushed the upper plate 10 against the opposite rail 24 or 25.

At its rearward or outer end, each connector 34 or 35 includes a pair of spaced washers 60 and 62, or 61 and 63, located on opposite sides of the respective wrap spring 40 or 41 and which enclose the axial ends of the respective actuating knob 38 or 39. As shown in FIG. 4, each connector 34 includes an inner washer 60 and an outer washer 62. Likewise, each connector 35 includes an inner washer 61 and an outer washer 63. Preferably, each pin 36 or 37 also includes a circumferential groove cut into its outer surface, just inward of the respective inner washer 60 or 61. This groove receives a snap ring 64 or 65 for holding the respective inner washer 60 or 61 in place. More specifically, as shown in FIG. 4, each of the snap rings 64 holds in place an inner washer 60. Finally, each pin 36 or 37 has a hollowed outer end which is internally threaded to receive an axially directed screw 66 or 67 to hold the parts of the respective connector 34 or 35 together.

For each connector 34 or 35, at its respective outer end, the wrap spring 40 or 41 includes a radially outwardly directed tang 72 which is received within a radially directed recess 74 in the respective actuating knob 38 or 39. The wrap springs 40 or 41 are coiled such that, when the respective pins 36 or 37 are rotatably extended, the frictional engagement between the inner surfaces of the wrap springs 40 or 41 and the outer surfaces of the pins 36 or 37 couples the rotational movement of the actuating knobs 38 or 39 to the respective pins 36 or 37.

For one 360° rotation, the rotational force applied to the knob 38 or 39 is directly coupled to the respective pin 36 or 37. After the knob 38 or 39 has been rotated 360° and the cam follower 52 or 53 has traversed the respective cam 50 or 51, any additional rotational force or torque applied to the knob 36 or 37 will cause the respective wrap spring 40 or 41 to slip around the pin 36 or 37. The slip torque for each connector 34 or 35 depends upon the relative diameters and the shapes of the wrap spring 40 or 41 and the pin 36 or 37. The relative diameters of the wrap spring 40 or 41 and the respective pin 36 or 37 may be varied as desired to provide a preset maximum applicable torque to the respective pins 36 or 37 after rotatable extension into engagement with the pallet 10. By using a slippable connection to limit the amount of torque that may be applied to the pins 36 and 37 upon rotation of the respective actuating knobs 38 and 39, the susceptibility of the pins 36 and 37 to breakage due to inadvertent over rotation is eliminated. Moreover, because of the configuration of the spiral cam 50 or 51, i.e. the steeply inclined portion 54 or 55 and the gradually inclined portion 56 or 57, the initial 90° of rotation of the actuating knob 38 or 39 causes engagement with the pallet 10, and then the subsequent 270° of rotation causes smooth alignment and centering of the pallet bores 18 and 19 with the pins 36 and 37.

To rotatably retract the pins 36 or 37, the respective actuating knobs 38 or 39 are rotated outwardly in directions opposite from the directions shown by directional arrows 58 and 59, on both sides of the lower plate 11. During rotation of the actuating knobs 38 or 39 to retract the pins 36 or 37, the cooperative interaction of the tangs 72 held by the radial recesses 74 of the respective actuating knobs 38 or 39 tightens the holding force or grip of the wrap springs 40 or 41 upon the respective pins 36 or 37. As a result, the wrap springs 40 or 41 act as clutches to couple and magnify the rotational force applied to the pins 36 or 37 by rotation of the respective knobs 38 or 39. Because initial rotation to retract the pin 36 or 37 occurs while the cam follower 52 or 53 traverses the gradually inclined portion 56 or 57 of the respective cam 50 or 51, and because the wrap spring 40 or 41 serves as a clutch between the actuating knob 38 or 39 and the pin 36 or 37, it is relatively easily to manually rotate the actuating knob 38 or 39 to retract the respective pin 36 or 37 out of engagement with the pallet 10.

To facilitate rotation for both extension and retraction of the pins 36 or 37, the actuating knobs 38 or 39 preferably include outer surfaces which are easy to grasp and rotate manually. More particularly, each actuating knob 38 preferably includes a plurality of smooth surfaces 78 spaced on centers around the axis 28. As shown in FIG. 1, actuating knob 38 includes four smooth surfaces 78 located on 90°. centers. Between every two smooth surfaces 78, each actuating knob 38 also includes a radially oriented aperture 80. Thus, actuating knob 38 also includes four apertures 80 spaced on 90° centers about axis 28. Similarly, each actuating knob 39 includes four apertures 81 spaced on 90° centers about axis 29 and located between four smooth surfaces 79 which are also spaced on 90° centers. The apertures 80 and 81 are sized to receive radially inserted "tommy" bars to facilitate rotation of the actuating knobs 38 or 39 about the respective axis 28 or 29.

FIG. 1 through 4 show the details of this invention with respect to an upper plate 10 adapted to be received on and secured to lower plate 11, wherein the connectors 34 and 35 are mounted to the lower plate 11. This arrangement is preferable if the number of work stations is relatively low compared to the number of parts which will be machined.

However, it is also to be understood that the invention contemplates the providing of supports 14 and 15 mounted to lower plate 11, with the shoulders 24 and 25 mounted to upper plate 10, so that the connecters 34 and 35 are carried by the upper plate 10. In effect, this arrangement would be an upside down version of what is shown in the Figures. This upside down version would be preferable if the number of workstations were relatively large in comparison to the number of parts machined.

For either of these two arrangements, with the members 14 and 15 rounded, the plate 10 and plate 11 are hingeably moveable about either of the two spaced axes 28 and 29. Moreover, if the members 14 and 15 are squared off on their bottom and outer sides, either of these two arrangements enables the upper plate 10 to be oriented perpendicular to the lower plate 11.

For use as a pallet changing system, it is preferable to mount the connectors 34 and 35 to the lower plate 11 so that the upper plate 10 can be made as light as possible, thereby minimizing the amount of weight that must be lifted. The embodiment of the invention described in FIG. 1 works particularly well as a sine plate or as a pallet system wherein the upper plate 10 is manually placed upon and secured to the work station defined by the lower plate 11.

The described embodiment is also particularly suitable for automated extension and retraction of the connectors 34 and 35 into engagement with the pallet 10. The slippable interconnection between the pins 36 or 37 and the respective actuating knobs 38 or 39 allows extension or retraction to be performed automatically, as by a stepping motor. For automatic extension and retraction, the actuating knobs 38 and 39 are preferably replaced with toothed gears.

Figure 5:
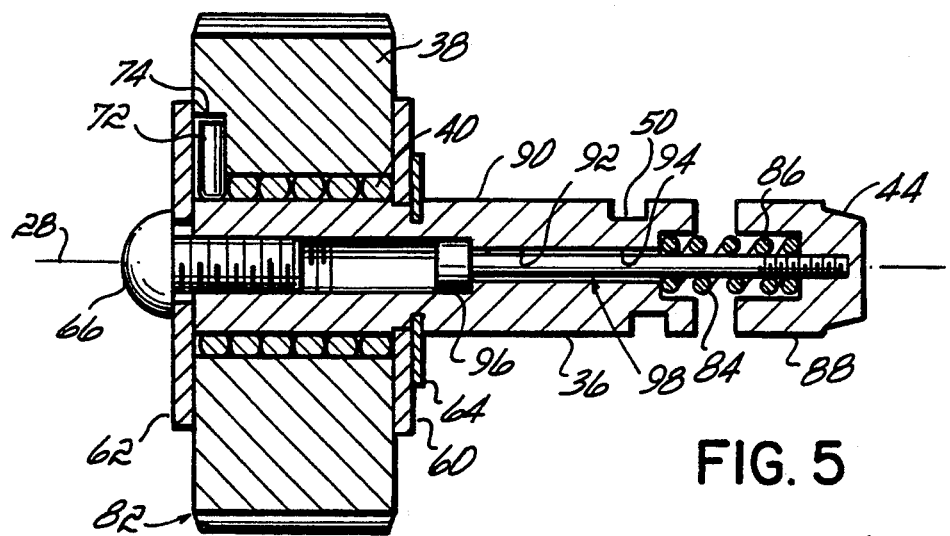
FIG. 5 is a cross-sectional view of a pallet connector in accordance with a second preferred embodiment of the invention.

Additionally, this invention further contemplates fully automating the sequential placement, securement and removal of a plurality of pallets 10 to the work station 11 in assembly line fashion. To fully automate this process, the invention contemplates the use of a connector or pin assembly 82 which is depicted in FIG. 5. The connector 82 is similar to connector 34 in many respects.

However, connector 82 also includes an internal compression spring 84 which resides within a spring pocket 86 and forces a first portion 88 of pin 36 from a second portion 90 thereof along the axis 28. The pin 36 has an internal bore 92 along its axial length. Preferably, the bore 92 has a reduced diameter forward portion 94 with a diameter of about 0.150", and an enlarged diameter rearward portion 96 with a diameter of about 0.257". The bore 92 receives an internal tap screw 98 which extends forwardly through spring 84 and threads within the first portion 88. The rearward portion 96 of bore 92 is oversized with respect to the screw 98 to permit rotational movement therebetween. The screw 98 maintains a maximum spacing of 0.130" between the first portion 88 and the second portion 90.

Figure 6A:
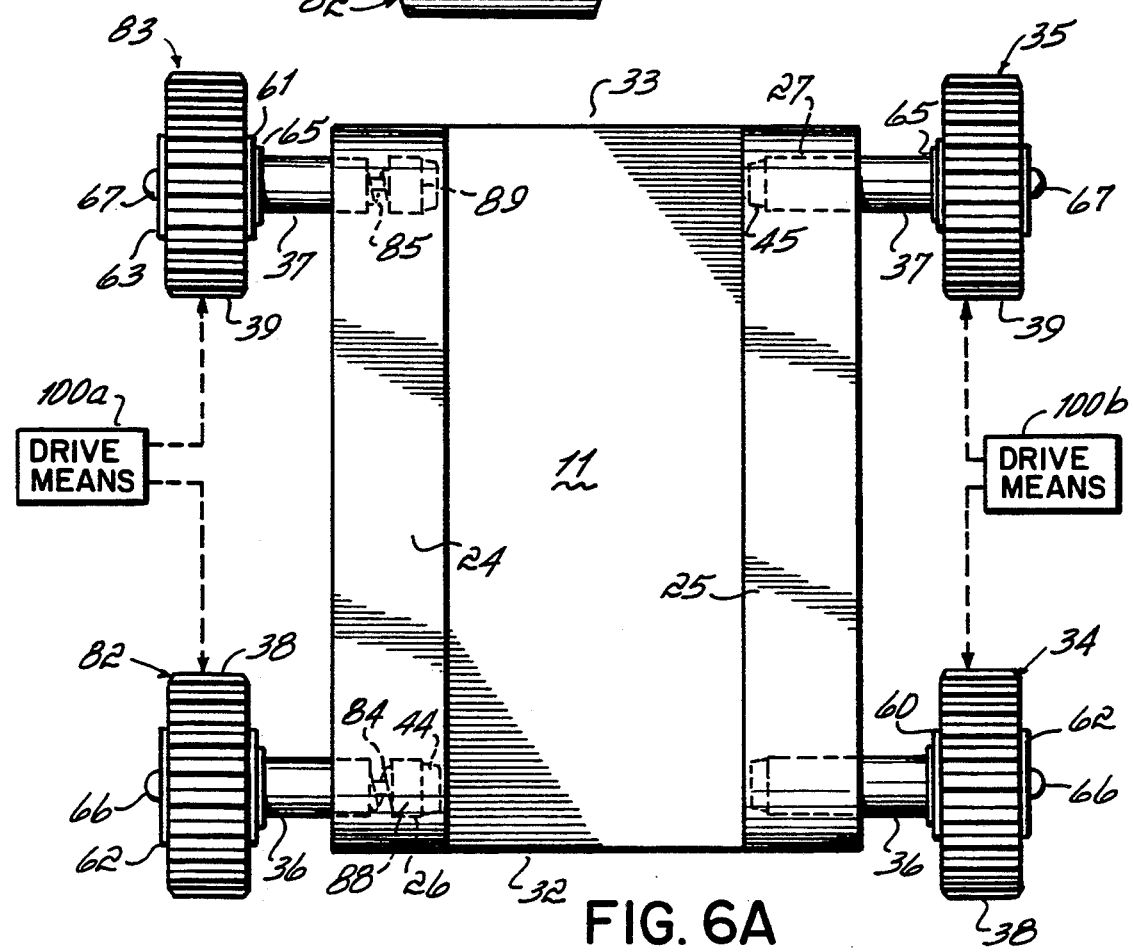
FIG. 6A is a schematic plan view of a work station in accordance with one aspect of the invention, wherein the work station is defined by a lower plate which utilizes, on one side, a pair of the connectors shown in FIG. 2 and on the other side, a pair of the connectors shown in FIG. 5.

The connector 82 also has a spiral cam 50, but it is not necessary for the cam 50 to have a gradually inclined section and a steep section. The connector 82 is utilized in an embodiment of the invention which is depicted sequentially in FIG. 6A, 6B, 6C and 6D. As shown in FIG. 6A, the connector 82 is aligned along axis 28 at the first end 32 of the work station 11. Another connector 83 is the mirror image of connector 82 with respect to a midplane transverse to shoulders 24 and 25. The connector 83 is aligned along the axis 29 at the second end 33 of work station 11.

Preferably, as shown in FIG. 6A, the actuating knobs 38 and 39 of respective connectors 82 and 83 are shown as toothed gears to facilitate coupling with a toothed gear (not shown) mounted to a shaft (not shown) of a first stepping motor 100a. Alternatively, the actuating knobs 38 and 39 may be connected to the motor 100a by a belt or by a beveled gear (represented by dash lines), so long as the connectors 82 and 83 may be automatically extended and retracted by rotating 360° about axes 28 and 29, respectively.

Similarly, on an opposite side of the work station 11, connectors 34 and 35 are aligned along axis 28 and axis 29, respectively. The connectors 34 and 35 are similar to the connectors described previously with respect to FIG. 1-4. However, the actuating knobs 38 and 39 of respective connectors 34 and 35 are also shown as toothed gears operatively connected to a second stepping motor 100b.

Initially, all of the connectors 82 and 34 and 83 and 35 are retracted within their respective bores 26 and 27, respectively, in the work station 11. In this position, the work station 11 is ready for placement, transfer, sliding, securement and then removal of pallet 10 by a robot arm (not shown).

Figure 6B:
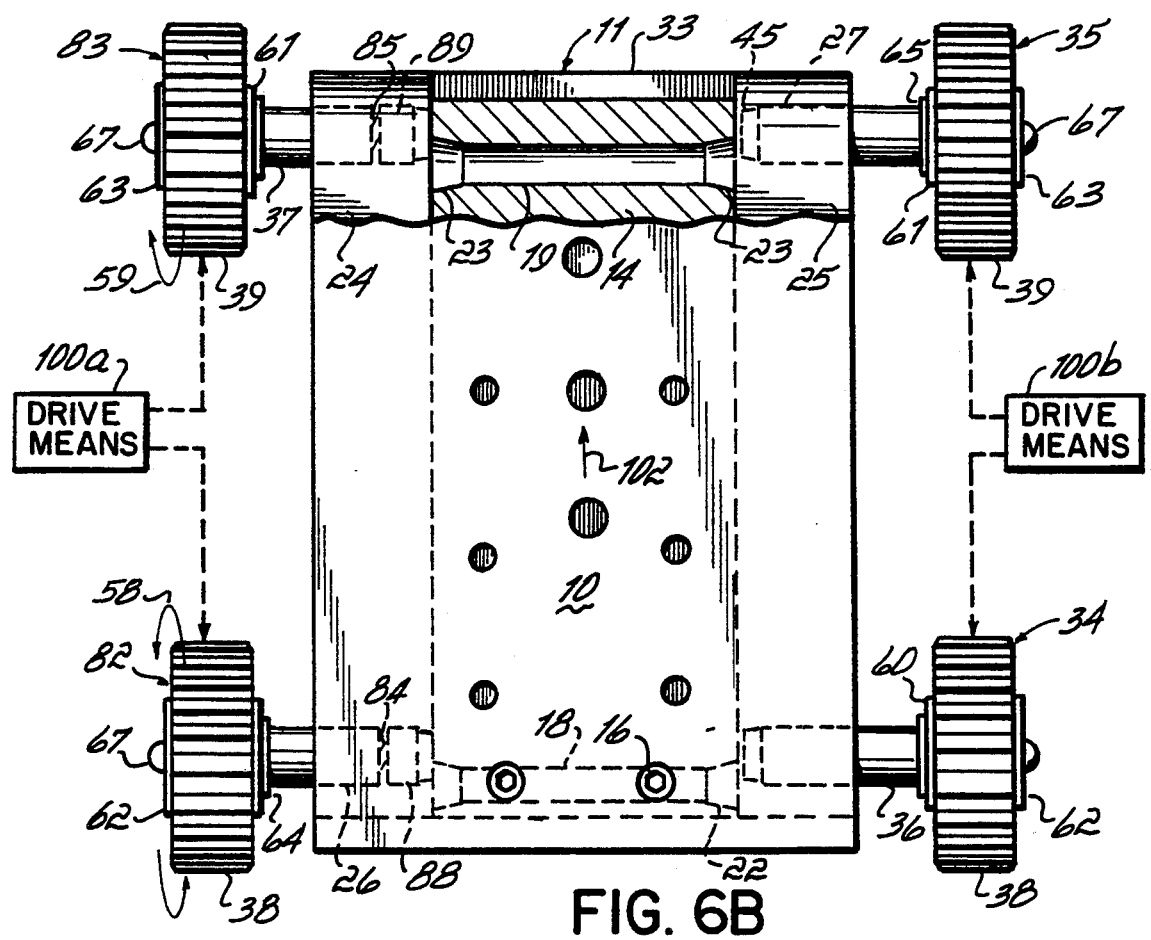
FIG. 6B is a schematic plan view, similar to FIG. 6A, which depicts an upper plate or pallet after initial placement upon the lower plate, just slightly out of alignment with a predetermined machining position, and with the connectors on the first side rotated inwardly to compress internal springs and cause forward ends of the pins to bear against the pallet.

The pallet 10 is then placed upon work station 11 automatically, as by a robot arm (not shown). As shown in FIG. 6B, the pallet 10 is placed on the work station 11 in a position slightly offset laterally with respect to the final desired machining position.

Thereafter, motor 100a rotates connectors 82 and 83 in the direction of arrows 58 and 59, respectively. This moves actuating gears 38 and 39, respectively, closer to shoulder 24. However, because the offset location of the pallet 10 blocks extension of the connectors 82 and 83, the respective forward portions 88 and 89 bear against the pallet 10 and are thus not able to extend beyond shoulder 24. As a result, the springs 84 and 85 are axially compressed. Thus, this step "loads" the internal springs 84 and 85.

Figure 6C:
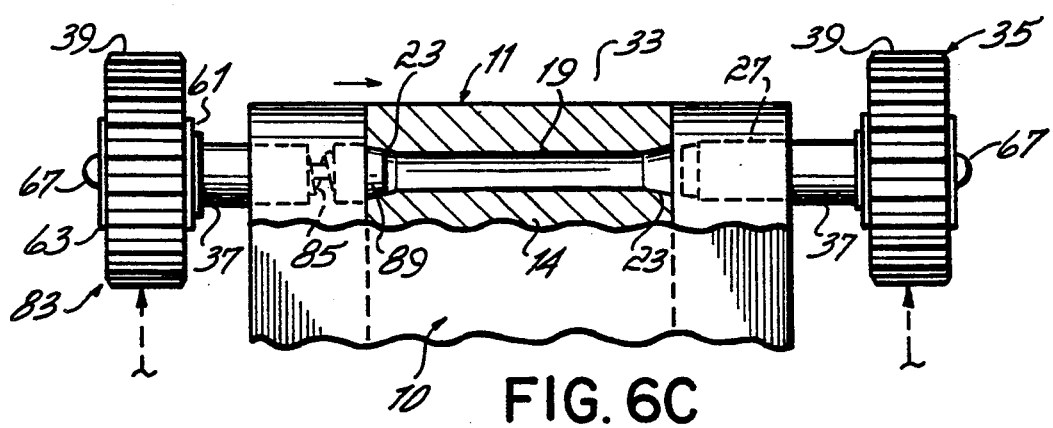
FIG. 6C is a partial schematic plan view, similar to FIG. 6B, which depicts the upper plate after it has been slid laterally on the lower plate to the predetermined machining portion, with a spring-loaded connector of the type shown in FIG. 5 spring-based into engagement with the upper plate.

With the upper plate 10 supported on the work station 11, the robot arm (not shown) applies a horizontal force in the direction shown by directional arrow 102 to laterally slide the pallet 10 along the work station 11. Eventually, bores 18 and 19 in members 14 and 15, respectively, will come into alignment with the bores 26 and 27. When this occurs, the springs 84 and 85 will cause the first portions 88 and 89, respectively, to extend into initial engagement with bores 18 and 19 on the first side of the work station 11. This temporarily holds the pallet 10 at the desired machining position. FIG. 6C shows the second end 33 of the work station 11 after spring extension.

Figure 6D:
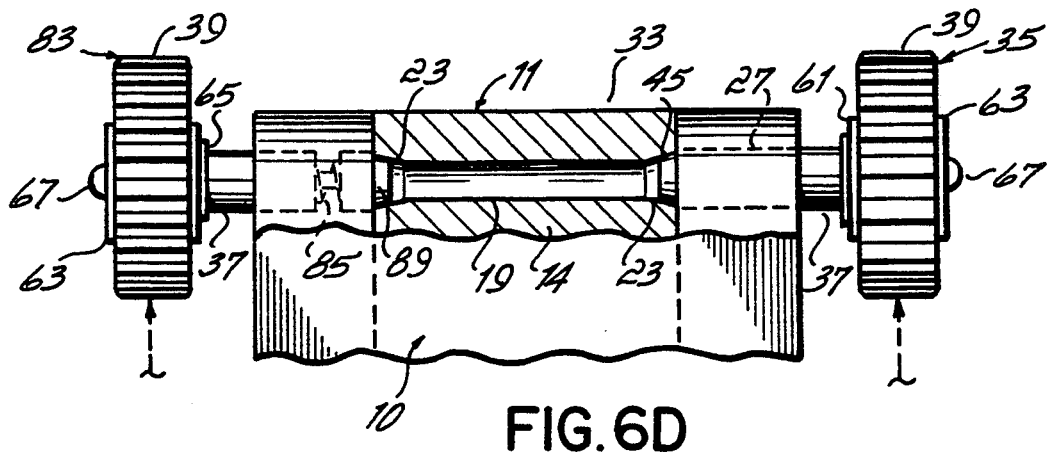
FIG. 6D is a partial schematic plan view, similar to FIG. 6C, which depicts the upper plate after the connector on the second side has been rotatably extended into secure engagement with the pallet at the predetermined machining position.

Subsequently, motor 100b rotates actuating gears 38 to 39 to rotatably extend the connectors 34 and 35, respectively, into engagement with the pallet 10 on the second side of the workstation 11. This rotation of connectors 34 and 35 holds the pallet 10 in dead center position with respect to axes 28 and 29. Moreover, the force applied via connectors 34 and 35 when in their extended positions holds the pallet 10 securely against the shoulder 24 on the first side of the work station 11, thereby providing for accurate positioning and machining of a workpiece held on the pallet 10. FIG. 6D shows the connectors 83 and 35 in engagement with the pallet 10 adjacent the second end 33 of the work station 11.

After a machining operation is completed, the connectors 82, 83, 34 and 35 are rotatably retracted from engagement with the pallet 10, and the pallet 10 is picked up by a robot arm (not shown) and moved to another station 11. Thereafter, another identical pallet 10 holding a workpiece is placed upon the work station 11.

Preferably, the stepping motors 100a and 100b and the robot arm (not shown) are operatively connected to a master, programmable controller (not shown) so that this entire operation can be performed according to a desired sequence and duration of steps. If desired, in addition to, or as an alternative to the use of spring-loaded connectors 82 and 83, the work station 11 may include one or more position sensors connected to the controller to indicate when pallet 10 has been placed upon work station 11 and/or laterally slid into the desired machining position on the work station 11.

Figure 7:
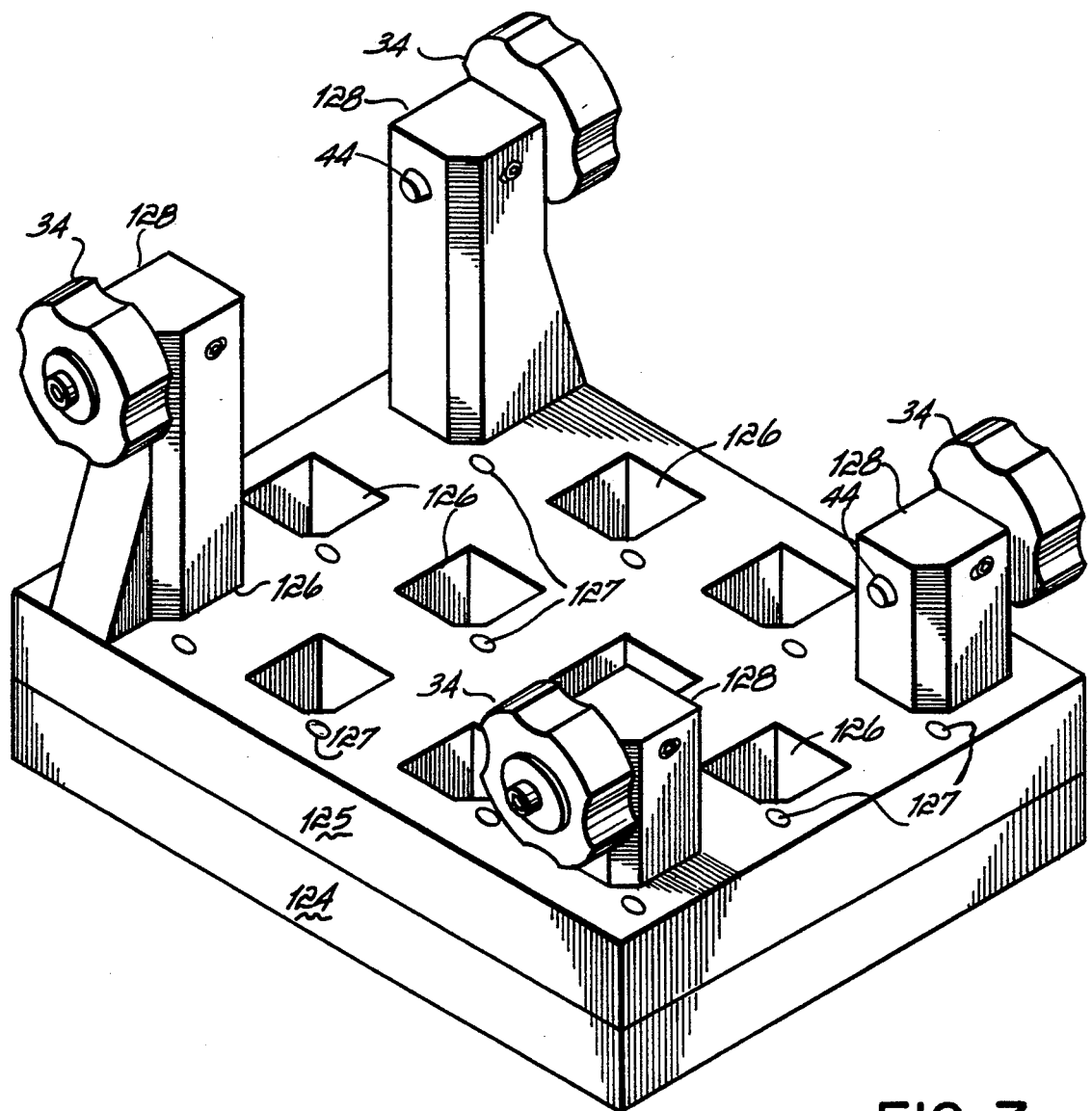
FIG. 7 is a perspective view of two pairs of aligned connectors mounted on upright members and used to suspend a workpiece in accordance with still another embodiment of the invention.

As yet another embodiment, this invention further contemplates the use of a plurality of connectors 34 or 35 to actually hold the workpiece itself, without mounting the workpiece to a pallet 10. According to this embodiment of the invention, as shown in FIG. 7, a work station 11 would be defined by two stacked plates 124 and 125. The bottom plate 124 is smooth on its top surface, while top plate 125 has a plurality of shaped holes 126 machined therethrough. Each hole 126 is adapted to receive an upright member 128 of predetermined height. Preferably, the upright 128 is held against the V-shape of the hole 126 by a screw threaded into on angled screw hole 127 located adjacent a flat or angled side of the hole 126. A plurality of uprights 128 of different height are provided. Each upright 128 includes a horizontal bore for receiving and horizontally supporting a connector 34. Each of the connectors 34 is rotatably extendable and retractable in a horizontal plane determined by the height of the respective upright 128.

With a workpiece of a particular shape and configuration located in the middle of four uprights 128, and with the respective connectors 34 aligned with rigid and engageable surfaces of the workpiece, extension of these aligned connectors 34 into engagement with the workpiece will hold the workpiece securely in a predetermined position for the performance of a machining or manufacturing operation. If desired, the members 128 may be extended horizontally from a plate 125 which is oriented vertically. This embodiment may be used to temporarily hold a variety of differently sized and shaped objects in a rigid position, from an engine block to a toaster.

In another variation of this embodiment, each hole 126 may be used to hold a relatively small size workpiece, with the workpiece held against the V-shaped corner opposite screw hole 127.

In addition, to use in holding a pallet, a sine plate or a workpiece, these connectors 34 could be incorporated into the design of an article of manufacture to render the article easy to assemble or disassemble, a feature that would be particularly advantageous in designing and manufacturing articles wherein the components must be recyclable.

While these and other features of a pallet/sine plate connector in accordance with several embodiments of the inventions have been described, it is to be understood that the invention is not limited thereby and in light of the present disclosure, various other alternative embodiments will be apparent to one of ordinary skill in the art without departing from the scope of the invention. Accordingly, applicant intends to be bound only by the following claims.

I claim:

1. A work-holding system comprising:
    an upper plate for holding a workpiece during a machining operation;
    a lower plate for supporting the upper plate at a workstation;
    connection means mounted to one of the upper and lower plates and selectively engageable with the other of the plates to accurately hold the upper plate at the workstation, the connection means including a pin aligned along an axis, an actuating knob and a wrap spring, the pin having forward and rearward ends and being rotatable about the axis in first and second directions, to continuously axially move the forward end of the pin into and out of engagement, respectively, with said other plate during said rotation, the actuating knob connected to the rearward end of the pin and the wrap spring operatively interconnecting the pin and the knob so that the pin and the knob are rotationally slippable about the axis.

2. The work-holding system of claim 1 wherein the wrap spring has a flat interior surface.

3. The work-holding system of claim 1 wherein said one plate includes a cam follower and the pin has a spiral cam formed in an outer surface thereof which cooperatively interacts with the cam follower, whereby rotation of the pin causes the cam follower to traverse along the cam to extend and to retract the pin into and out of engagement with said other plate.

4. The work-holding system of claim 3 wherein the spiral cam extends about 360° around an outer surface of the pin.

5. The work-holding system of claim 3 wherein the cam has a gradually angled portion and a steeply angled portion.

6. The work-holding system of claim 1 wherein the connection means further comprises:
a second spring located between the forward and rearward ends of the pin.

7. The work-holding system of claim 1 and further comprising:
automatic means operatively connected to the actuating knob to automatically rotate the pin into and out of engagement with said other plate.

8. The work-holding system of claim 7 wherein said automatic means includes a stepping motor.

9. The work-holding system of claim 8 wherein the actuating knob is a toothed gear to facilitate cooperative interaction with the stepping motor.

10. The work-holding system of claim 1 wherein the pin has a forward end which engages said other plate and the forward end has an angled surface, said other plate having a complementarily angled surface to cooperatively interact with the forward end of the pin during engagement, thereby to hold the upper plate to the lower plate in a precise and repeatable position.

11. An interchangeable pallet system comprising:
a pallet for holding a workpiece at a workstation;
axially extendable/retractable coupling means operatively connected to the pallet and the workstation for selective engagement of the pallet to the workstation along an axis of engagement, the coupling means including at least one pin aligned along the axis, an actuating knob and a wrap spring, the pin being rotatable in first and second directions about the axis to axially move a forward end thereof into and out of engagement with the pallet, respectively, thereby to selectively hold the pallet and the workpiece at a desired machining position;
the knob located at a rearward end of the pin; and
the wrap spring operatively interconnecting the pin and the knob in a slippable manner, the wrap spring serving as a torque limiting device during rotation of the knob about the axis in the first direction, thereby to extend the pin into engagement with the pallet, and serving as a clutch during rotation of the knob about the axis in the second direction, thereby to retract the pin from engagement with the pallet.

12. The interchangeable pallet system of claim 11 wherein the coupling means further comprises:
a rounded support member at the bottom of the pallet and aligned along the axis; and
a second oppositely directed pin aligned along the axis, the pins adapted to engage the support member along the axis and from opposite sides to provide hingeable engagement of the pallet at the workstation.

13. The interchangeable pallet system of claim 12 wherein the coupling means further comprises:
a second support member at the bottom of the pallet and aligned along a second axis which is parallel to and spaced from the first axis; and
another pair of oppositely directed pins aligned along the second axis and adapted to engage the second support member along the second axis from opposite sides, thereby to provide hingeable engagement of the pallet along a pair of spaced, parallel axes.

14. The interchangeable pallet system of claim 13 and further comprising:
automatic control means operatively connected to the coupling means to automatically rotate the pins into and out of engagement with the pallet.

15. The interchangeable pallet system of claim 14 wherein two of the pins are located on a first side of the workstation, and further comprising:
each of the pins on the first side of the workstation including an internal spring located between inward and outward ends of the respective pin, thereby to extend an outer end of the respective pin into engagement with the pallet prior to rotation of the respective actuating knob.

16. The interchangeable pallet system of claim 11 wherein the coupling means further comprises:
an elongated support member at the bottom of the pallet and aligned along the axis, the support member having a flat bottom surface and a flat side surface contiguous with a side of the pallet to permit holding of the pallet to the workstation in horizontal orientation and in vertical orientation, respectively.

17. A method for accurately mounting a workpiece-holding pallet at a predetermined position at a workstation comprising the steps of:
placing the workpiece-holding pallet on the workstation slightly away from the predetermined position;
rotating a first pair of connectors to cause forward ends of the first connectors to extend into contact and to bear against the pallet as internal springs within each of the connectors are axially compressed;
sliding the pallet on the workstation toward the predetermined position until the forward ends of the first pair of connectors extend by axial spring force into initial engagement with a corresponding first pair of spaced and machined surfaces located on a first side of the pallet; and
rotably extending a second pair of spaced connectors into engagement with a corresponding second pair of spaced and machined surfaces located on a second side of the pallet, thereby to secure the pallet to the workstation at the predetermined position.

18. The method of claim 17 wherein the placing and the sliding steps and the two rotatably extending steps are performed automatically and the sequence of performance of the four steps is coordinated by a programmable controller.

19. A connecting mechanism for accurately mounting a workpiece-holding pallet to a mounting member at a workstation, the mechanism comprising:

a pin rotably mounted to one of the pallet and the member, the pin axially movable along an axis into and out of engagement with the other of the pallet and the member via rotation in first and second directions, respectively, about the axis and with respect to said one of the pallet and the member;

an actuating knob located at one end of the pin to facilitate rotation thereof; and a wrap spring operatively interconnecting the pin and the knob in a slippable manner, the wrap spring serving as a torque limiting device during rotation of the knob about the axis in the first direction, thereby to extend the pin into engagement with the pallet, and serving as a clutch during rotation of the knob about the axis in the second direction, thereby to retract the pin from engagement with the pallet.

* * * * *

UNITED STATES PATENT AND TRADEMARK OFFICE
CERTIFICATE OF CORRECTION

PATENT NO. : 5,363,563
DATED : November 15, 1994
INVENTOR(S) : Jerry J. Hunter

It is certified that error appears in the above-indentified patent and that said Letters Patent is hereby corrected as shown below:

Column 7, Line 8, "0,148" should read --0.148--.

Signed and Sealed this

Twenty-eighth Day of November 1995

Attest:

BRUCE LEHMAN

Attesting Officer  Commissioner of Patents and Trademarks